US012732832B2

(12) United States Patent
Elsammak et al.

(10) Patent No.: US 12,732,832 B2
(45) Date of Patent: Sep. 8, 2026

(54) E2 SERVICE MODEL ABSTRACTION

(71) Applicant: Dell Products L.P., Round Rock, TX (US)

(72) Inventors: Nada Elsammak, New Cairo City (EG); Omar Wael Ahmed Ahmed Gad, Cambridge (GB); Mohamed Abouzeid, El Sheikh Zayed (EG); Marwan Mansour, Alexandria (EG)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 18/639,660

(22) Filed: Apr. 18, 2024

(65) Prior Publication Data

US 2025/0330838 A1 Oct. 23, 2025

(51) Int. Cl.
*H04W 24/02* (2009.01)
*H04W 4/60* (2018.01)

(52) U.S. Cl.
CPC ............. *H04W 24/02* (2013.01); *H04W 4/60* (2018.02)

(58) Field of Classification Search
CPC ................................ H04W 24/02; H04W 4/60
See application file for complete search history.

(56) References Cited

U.S. PATENT DOCUMENTS

2023/0069604 A1* 3/2023 Subramani .............. G06F 9/547
2024/0223240 A1* 7/2024 Hegde .................... H04B 7/024
2024/0224305 A1* 7/2024 Kang .................... H04W 72/50

* cited by examiner

*Primary Examiner* — Justin Y Lee
(74) *Attorney, Agent, or Firm* — Amin, Turocy & Watson, LLP

(57) ABSTRACT

A system can comprise a near real-time radio access network intelligent controller that comprises an application and a service model component, wherein the service model component is configured to receive respective indications of supported service models and key performance indicators from respective network nodes of a group of network nodes that is part of a radio access network, wherein the service model component is configured to receive a request from the application for a key performance indicator, wherein the service model component is configured to subscribe to a network node of the group of network nodes for the key performance indicator, wherein the network node supports a service model that is unsupported by the application and that is supported by the service model component, and wherein the key performance indicator is returned to the application via a communications protocol that is supported by the application.

20 Claims, 13 Drawing Sheets

1000

THE SERVICE MODEL COMPONENT RECEIVES RESPECTIVE INDICATIONS OF SUPPORTED SERVICE MODELS AND KEY PERFORMANCE INDICATORS FROM RESPECTIVE NETWORK NODES OF A GROUP OF NETWORK NODES THAT IS PART OF A RADIO ACCESS NETWORK 1004

THE SERVICE MODEL COMPONENT RECEIVES A REQUEST FROM THE APPLICATION FOR A KEY PERFORMANCE INDICATOR 1006

THE SERVICE MODEL COMPONENT SUBSCRIBES TO A NETWORK NODE OF THE GROUP OF NETWORK NODES FOR THE KEY PERFORMANCE INDICATOR 1008

THE NETWORK NODE SUPPORTS A SERVICE MODEL THAT IS UNSUPPORTED BY THE APPLICATION AND THAT IS SUPPORTED BY THE SERVICE MODEL COMPONENT 1010

THE KEY PERFORMANCE INDICATOR IS RETURNED TO THE APPLICATION VIA A COMMUNICATIONS PROTOCOL THAT IS SUPPORTED BY THE APPLICATION 1012

1014

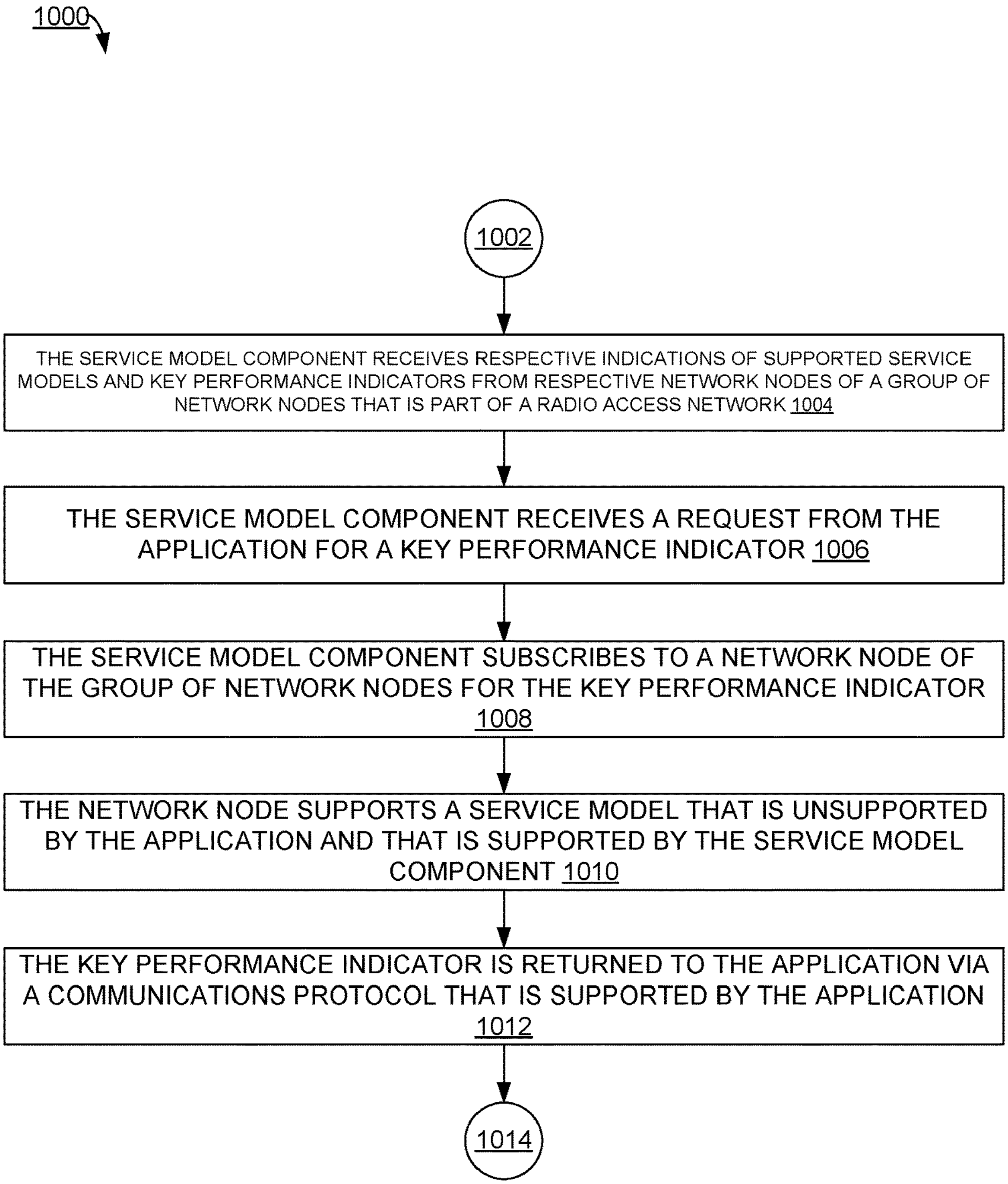

RECEIVING, BY A NEAR REAL-TIME RADIO ACCESS NETWORK INTELLIGENT CONTROLLER, RESPECTIVE INDICATIONS OF SUPPORTED SERVICE MODELS AND KEY PERFORMANCE INDICATORS FROM RESPECTIVE NETWORK NODES OF A GROUP OF NETWORK NODES IN A RADIO ACCESS NETWORK 1104

RECEIVING, BY THE BY THE NEAR REAL-TIME RADIO ACCESS NETWORK INTELLIGENT CONTROLLER, A REQUEST FROM AN APPLICATION OF THE NEAR REAL-TIME RADIO ACCESS NETWORK INTELLIGENT CONTROLLER FOR A KEY PERFORMANCE INDICATOR 1106

SUBSCRIBING, BY THE NEAR REAL-TIME RADIO ACCESS NETWORK INTELLIGENT CONTROLLER, TO A NETWORK NODE OF THE GROUP OF NETWORK NODES FOR THE KEY PERFORMANCE INDICATOR, WHEREIN THE NETWORK NODE SUPPORTS A SERVICE MODEL THAT IS UNSUPPORTED BY THE APPLICATION AND THAT IS SUPPORTED BY THE NEAR REAL-TIME RADIO ACCESS NETWORK INTELLIGENT CONTROLLER 1108

RETURNING, BY THE NEAR REAL-TIME RADIO ACCESS NETWORK INTELLIGENT CONTROLLER, THE KEY PERFORMANCE INDICATOR TO THE APPLICATION 1110

1112

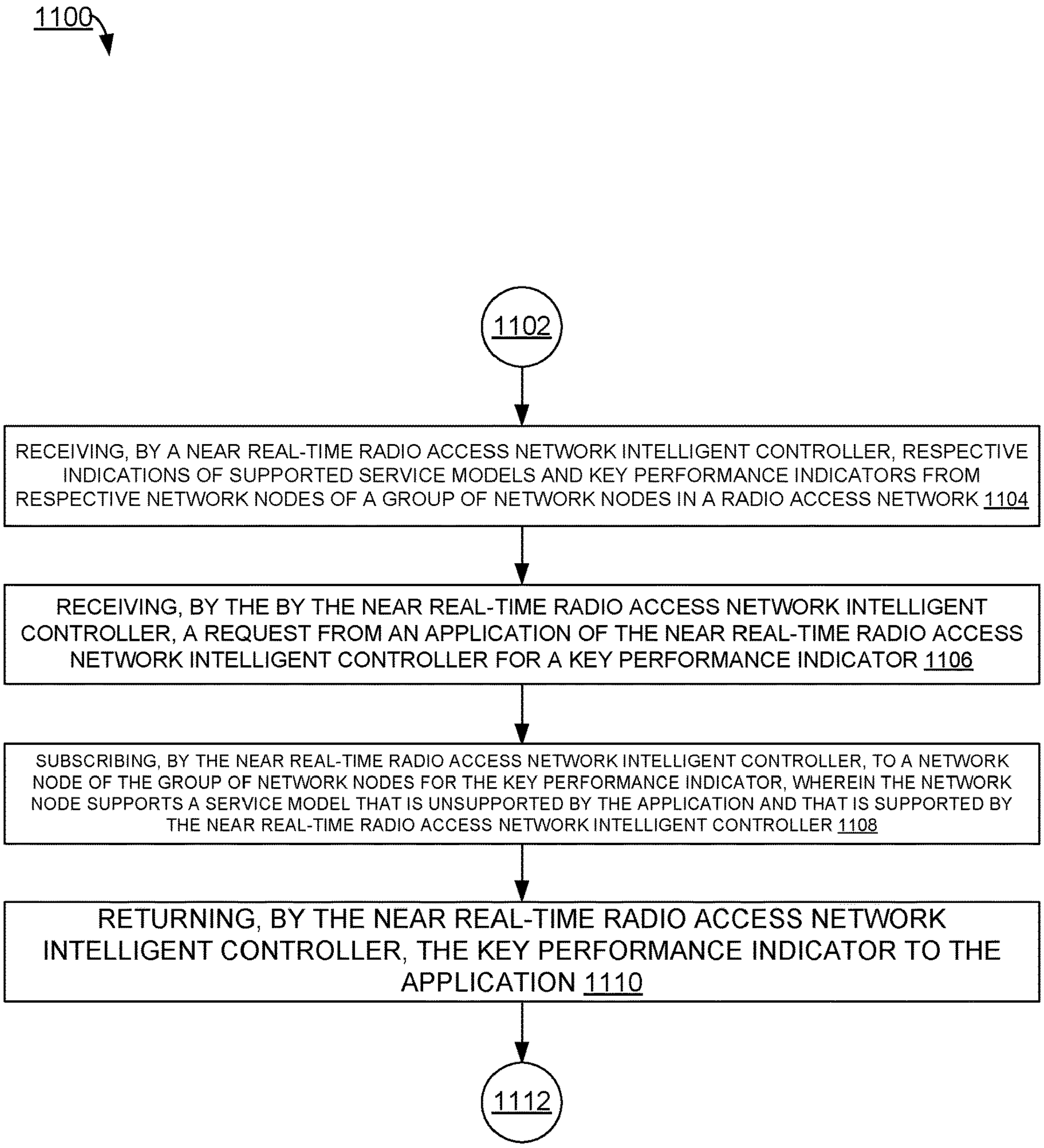

FIG. 11

E2 SERVICE MODEL ABSTRACTION

BACKGROUND

A radio access network (RAN) can comprise a type of broadband cellular communications network. An open radio access network (O-RAN) can comprise a system architecture for a RAN.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a near real-time radio access network intelligent controller that comprises an application and a service model component, wherein the service model component is configured to receive respective indications of supported service models and key performance indicators from respective network nodes of a group of network nodes that is part of a radio access network, wherein the service model component is configured to receive a request from the application for a key performance indicator, wherein the service model component is configured to subscribe to a network node of the group of network nodes for the key performance indicator, wherein the network node supports a service model that is unsupported by the application and that is supported by the service model component, and wherein the key performance indicator is returned to the application via a communications protocol that is supported by the application.

An example method can comprise receiving, by a near real-time radio access network intelligent controller of a system comprising at least one processor, respective indications of supported service models and key performance indicators from respective network nodes of a group of network nodes in a radio access network. The method can further comprise receiving, by the by the near real-time radio access network intelligent controller, a request from an application of the near real-time radio access network intelligent controller for a key performance indicator. The method can further comprise subscribing, by the near real-time radio access network intelligent controller, to a network node of the group of network nodes for the key performance indicator, wherein the network node supports a service model that is unsupported by the application and that is supported by the near real-time radio access network intelligent controller. The method can further comprise returning, by the near real-time radio access network intelligent controller, the key performance indicator to the application.

An example non-transitory computer-readable medium can comprise instructions that, in response to execution, cause a system comprising a processor to perform operations. These operations can comprise receiving respective indications of supported service models and key performance indicators from respective network nodes of a group of network nodes. These operations can further comprise receiving a request from an application of the near real-time radio access network intelligent controller for a key performance indicator. These operations can further comprise subscribing to a network node of the group of network nodes for the key performance indicator. These operations can further comprise returning the key performance indicator to the application.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 10 illustrates an example process flow that can facilitate E2 service model abstraction, in accordance with an embodiment of this disclosure;

FIG. 11 illustrates another example process flow that can facilitate E2 service model abstraction, in accordance with an embodiment of this disclosure;

DETAILED DESCRIPTION

Overview

Figure 1:
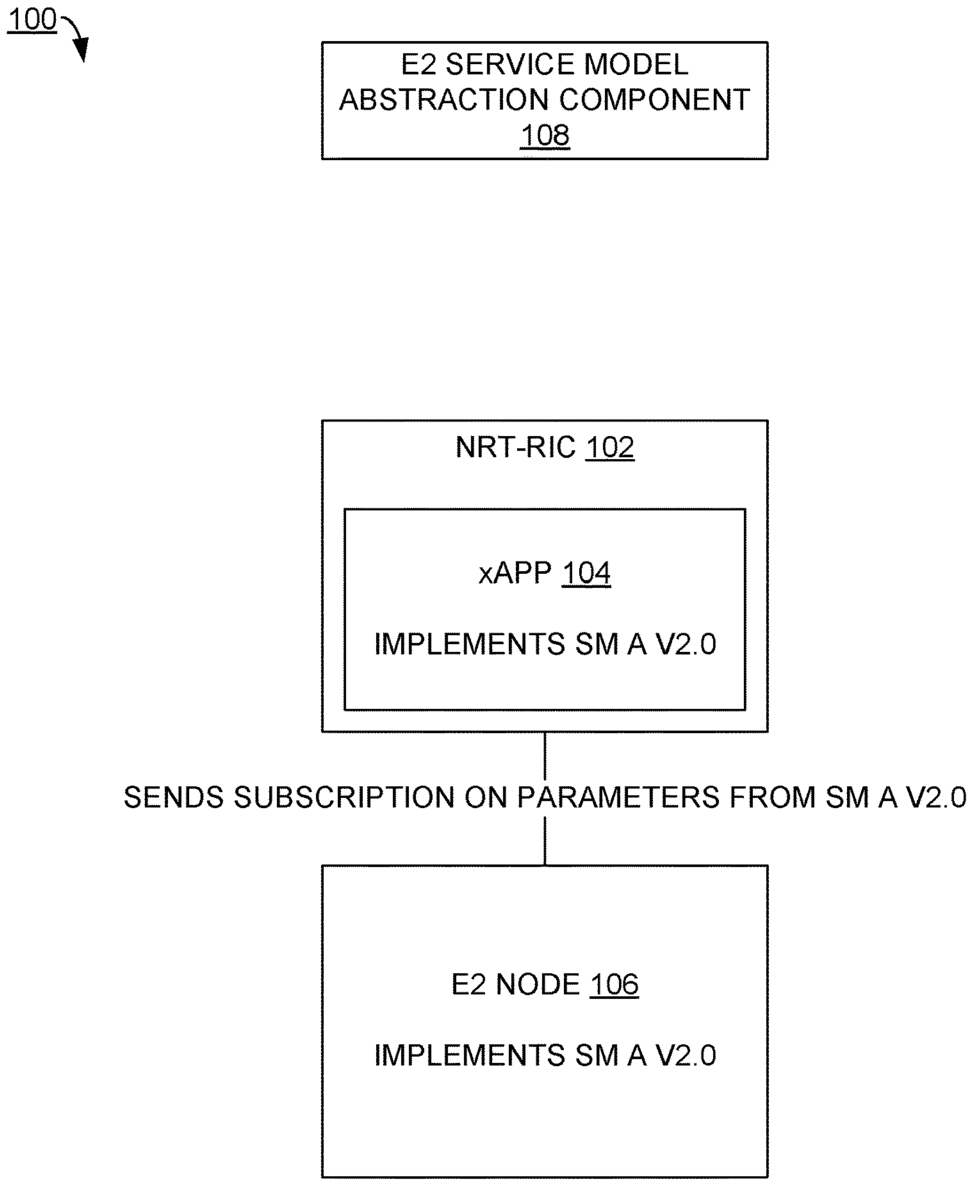
FIG. 1 illustrates an example system architecture that can facilitate E2 service model abstraction, in accordance with an embodiment of this disclosure.

The present examples generally relate to broadband cellular communications, particularly fifth-generation (5G) networks. It can be appreciated that the present techniques can be applied to other types of cellular networks. An Open Radio Access Network (O-RAN) can comprise an implementation of a cellular network. An O-RAN can comprise a disaggregated network where different vendors are used to supply components such as a radio unit (RU), a distributed unit (DU), and a centralized unit (CU).

An O-RAN can comprise an E2 interface, which can comprise an open interface between two end points, such as a near-real time RAN intelligent controller (near-RT RIC) and E2 nodes (e.g., distributed units (DUs), centralized units (CUs), and e-NodeBs (eNBs, sometimes referred to as base stations)). An E2 interface can facilitate a RIC in controlling procedures and functionalities of E2 nodes.

In an O-RAN, rApps can comprise specialized microservices operating on a non-RT RIC. Then extended applications (xApps) can be hosted on a near-RT RIC, and optimize radio spectrum efficiency.

In a near real-time RIC, third parties can be allowed to design xApps that run on a RIC platform to optimize a RAN by subscribing to and analyzing data being reported by E2 nodes. In some examples, this data can be standardized and can be scattered across multiple service models, making it difficult to cover all bases, as it can be that E2 nodes might not support all versions of all service models.

However, an xApp may not be updated to be aware of newly available service models, and what parameters are available in them. This can cause a problem of interoperability issues between some xApps and some E2 nodes that might not support the service model the xApp expects, although the E2 nodes might still have the data the xApp needs.

The present techniques can be implemented to mitigate this problem. The present techniques can be implemented to facilitate abstracting service models from xApps, where xApps are concerned only with the parameters they need. This can involve implementing a service model abstraction layer and a service model calculator.

The service model (SM) abstraction layer can involve implementing a centralized service that gathers data on service models and versions, and maps out a compatibility between parameters across xApps and E2 nodes.

The service model calculator can comprise a service that is responsible for determining how each parameter can be derived—e.g., determine it from already-existing parameters, or by subscribing directly to it.

The present techniques can be implemented to facilitate an abstraction of an NRT-RIC service model from xApps, such that the xApps can be concerned with the parameters that they subscribe on rather than the service models themselves. This can facilitate removing service model version monitoring and interoperability efforts from an xApp development experience.

Beyond secure registrations by xApps, the present techniques can be implemented to facilitate an abstraction of an E2 service model within an NRT-RIC (from the perspective of an xApp). This can provide value in a form of an improved development experience, avoiding subscribing to data according to multiple service models, and instead communicating with an abstraction layer that provides one unified standard interface. This can mitigate against interoperability problems, where developers must monitor the version of the service models available at the E2 node, since the abstraction layer can handle the mapping of the requested data to the appropriate subscription messages following the SM version.

Additionally, the present techniques can provide value in cases where an xApp requires a KPI that is not directly offered by an E2 node, but is derivable from available parameters. In this case, the abstraction layer can determine the required KPIs, and the SM calculator can perform the derivation using the set of input KPIs.

An SM abstraction layer can operate as a platform function. Therefore, xApp developers intending to make use of the present techniques can follow a clear documentation on the messaging interface between a given xApp and said platform functions. A messaging protocol as described herein can be integrated as part of an xApp use case.

There can be problems with prior approaches. There can be problems relating to data collection limitations. RAN data can be scattered across multiple E2 service models (E2SM). It can be that, for an xApp to obtain a parameter, it must support that E2SM. For an xApp with complex logic and/or use-cases, it can be that the xApp must support a great number of E2 service models, and handle all those different subscriptions for those parameters.

xApps can limited to what E2 nodes support. In order to successfully obtain that information from the RAN, it can be that the E2 nodes must support those same exact E2 service models with the exact versions to be able to provide the xApp with any data.

There can be problems relating to interoperability limitations. That is, interoperability across vendors can be complicated since subscriptions can add an extra alignment step across the different vendors.

There can be problems related to xApp development limitations. It can be that xApp developers must have a knowledge of how the information they need is presented in particular E2 service models, and it can be that they must support all those E2 service models accordingly. Furthermore, it can be that xApp developers must stay up to date on any new version releases of the E2 service models post-development and even post-deployment to evaluate whether they need to upgrade or not.

Example Architectures, Etc

FIG. 1 illustrates an example system architecture 100 that can facilitate E2 service model abstraction, in accordance with an embodiment of this disclosure. In some examples, part(s) of system architecture 100 can be used by part(s) of system architecture 200 of FIG. 2 to facilitate E2 service model abstraction.

System architecture 100 comprises NRT-RIC 102, xApp 104, E2 node 106, and E2 service model abstraction component 108 (which can implement part(s) of the present techniques).

It can be in system architecture 100 that xApp 104 can receive KPIs from E2 node 106 only where xApp 104 and E2 node 106 use a same service model.

Figure 2:
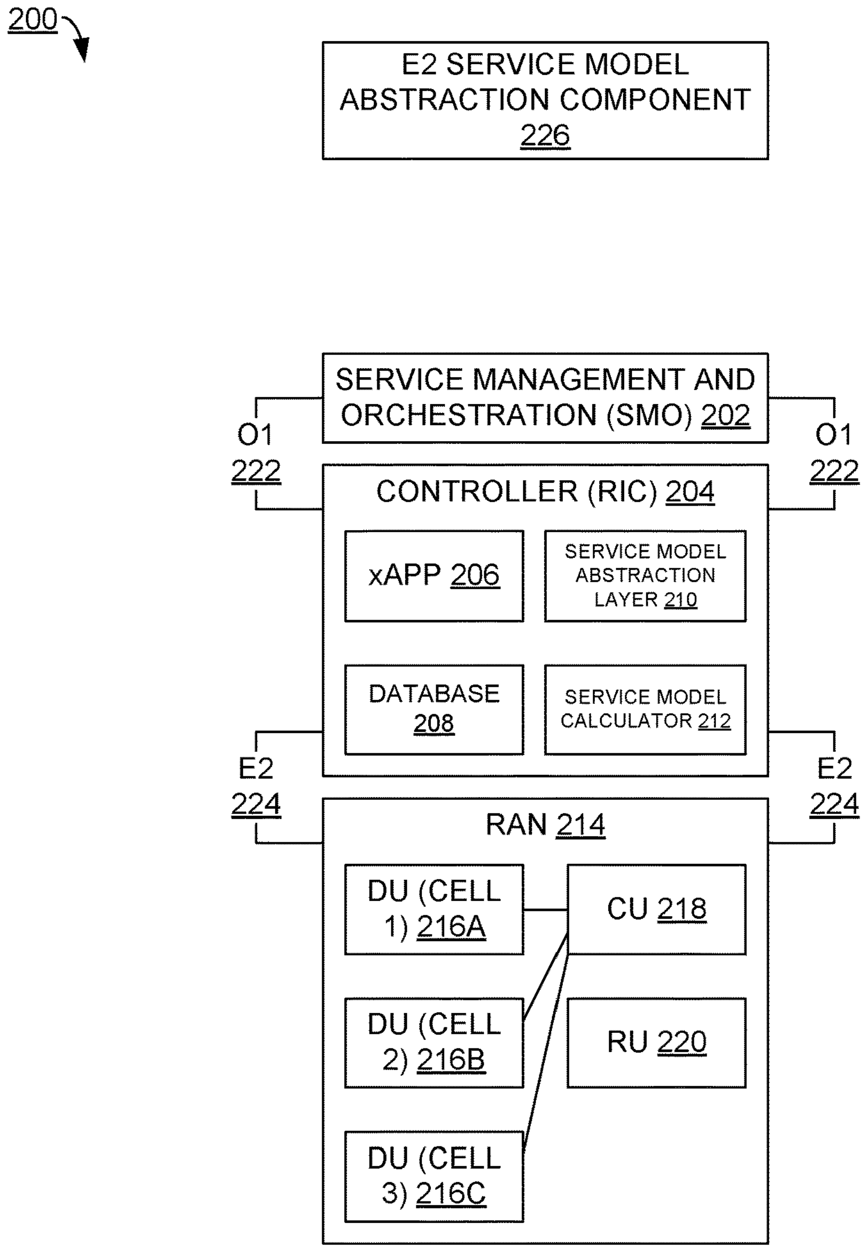
FIG. 2 illustrates another example system architecture that can facilitate E2 service model abstraction, in accordance with an embodiment of this disclosure.

FIG. 2 illustrates another example system architecture 200 that can facilitate E2 service model abstraction, in accordance with an embodiment of this disclosure.

An example system architecture that implements the present techniques can be as follows. A SMO can comprise a management and orchestration layer that controls configuration and automation aspects of RIC and RAN elements.

A controller can comprise a database, an xApp, a service model abstraction layer, and a service model calculator. The database can store data needed by a RIC, including information about a RAN, and can store KPIs. An xApp can comprise an application deployed in the RIC that handles optimizations for specific use cases.

A service model abstraction layer can map out E2 spec parameters across xApps and E2 nodes from different E2 service models and different versions of those models. The service model abstraction layer can maintain a relation between SM parameters, and send (at least some of) them to the SM calculator when a parameter is to be derived from other parameters.

A service model calculator can calculate requested parameters from already-available parameters that are exposed by E2 nodes and/or E2SMs.

A RAN can comprise a DU, a CU, and a RU as E2 nodes.

System architecture 200 comprises service management and orchestration (SMO) 202, controller (RIC) 204, xApp 206, database 208, service model abstraction layer 210, service model calculator 212, RAN 214, DU (cell 1) 216A, DU (cell 2) 216B, DU (cell 3) 216C, CU 218, RU 220, O1 222, E2 224, and E2 service model abstraction component 226 (which can be similar to E2 service model abstraction component 108 of FIG. 1).

Figure 3:
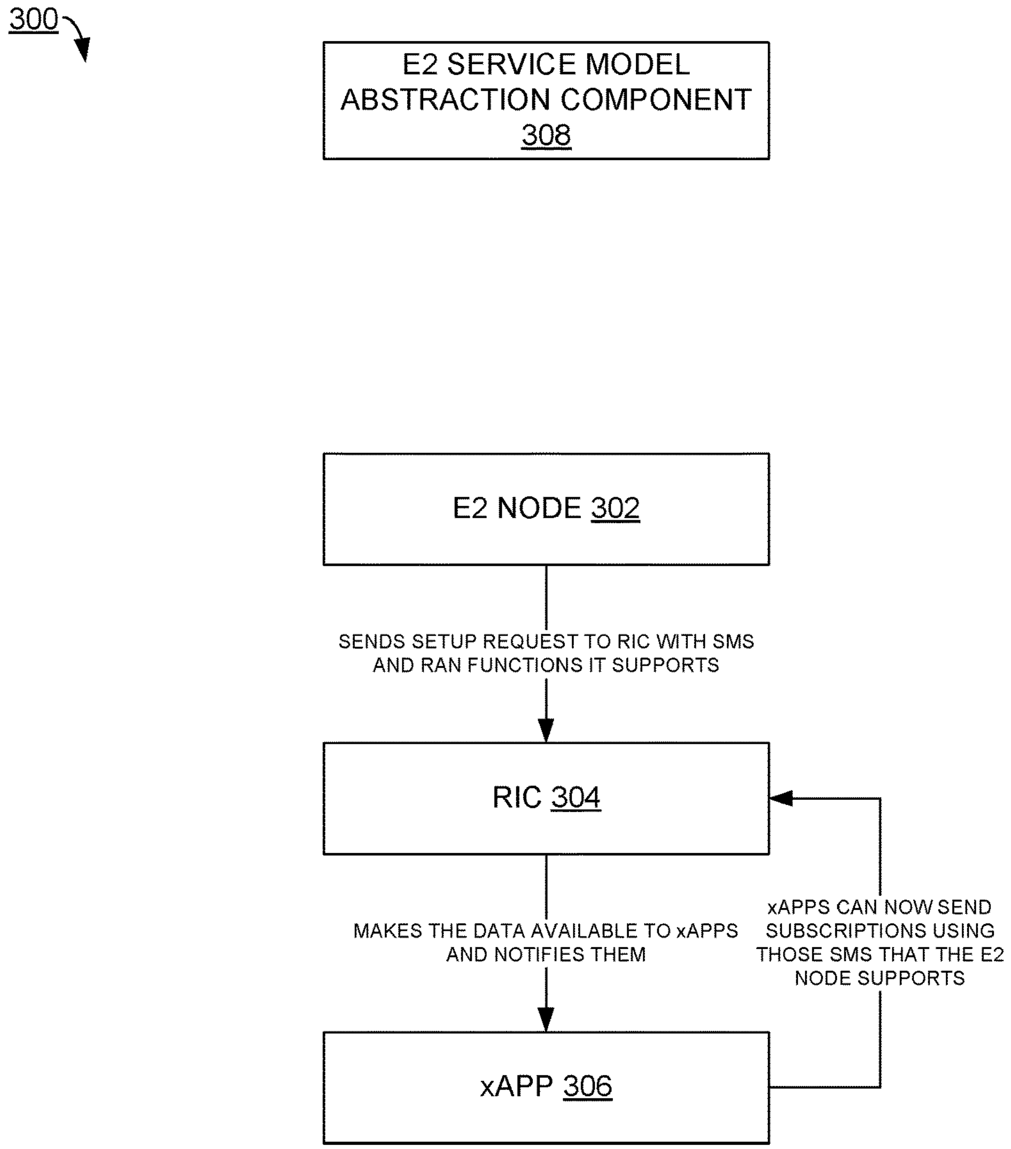
FIG. 3 illustrates another example system architecture that can facilitate E2 service model abstraction, in accordance with an embodiment of this disclosure.

FIG. 3 illustrates another example system architecture 300 that can facilitate E2 service model abstraction, in accordance with an embodiment of this disclosure. In some examples, part(s) of system architecture 300 can be used by part(s) of system architecture 200 of FIG. 2 to facilitate E2 service model abstraction.

Prior approaches can depend on E2 nodes advertising the exact E2 service models and versions they support through a RIC. Then, the xApps can use this information to subscribe to the nodes accordingly.

System architecture 300 comprises E2 node 302, RIC 304, xApp 306, and E2 service model abstraction component 308 (which can be similar to E2 service model abstraction component 108 of FIG. 1).

In prior approaches, it can be that the subscribing xApp must support the same service model and version as the E2 node that the xApp is trying to subscribe to. So, it can be in system architecture 300 that xApp 306 can receive KPIs from E2 node 302 only where xApp 306 and E2 node 302 use a same service model.

Figure 4:
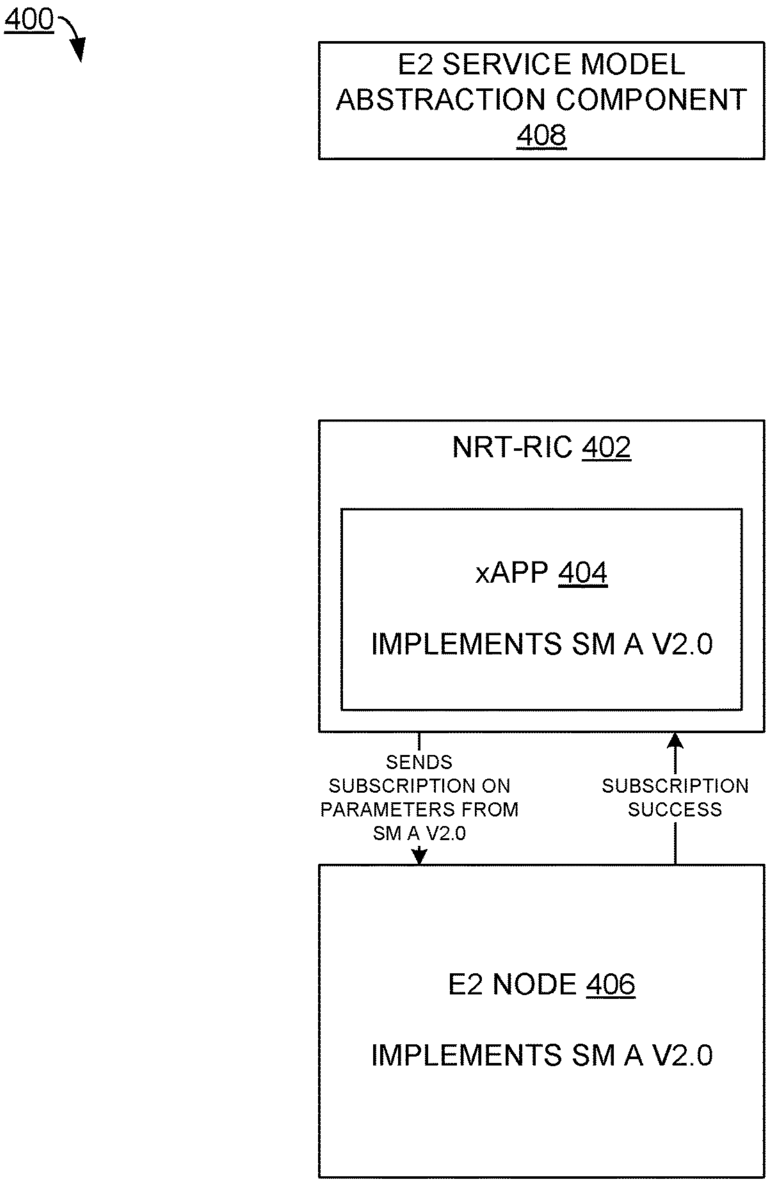
FIG. 4 illustrates another example system architecture that can facilitate E2 service model abstraction, in accordance with an embodiment of this disclosure.

FIG. 4 illustrates another example system architecture 400 that can facilitate E2 service model abstraction, in accordance with an embodiment of this disclosure. In some examples, part(s) of system architecture 400 can be used by part(s) of system architecture 200 of FIG. 2 to facilitate E2 service model abstraction.

System architecture 400 comprises NRT-RIC 402, xApp 404, e2 node 406, and E2 service model abstraction component 408 (which can be similar to E2 service model abstraction component 108 of FIG. 1).

Figure 5:
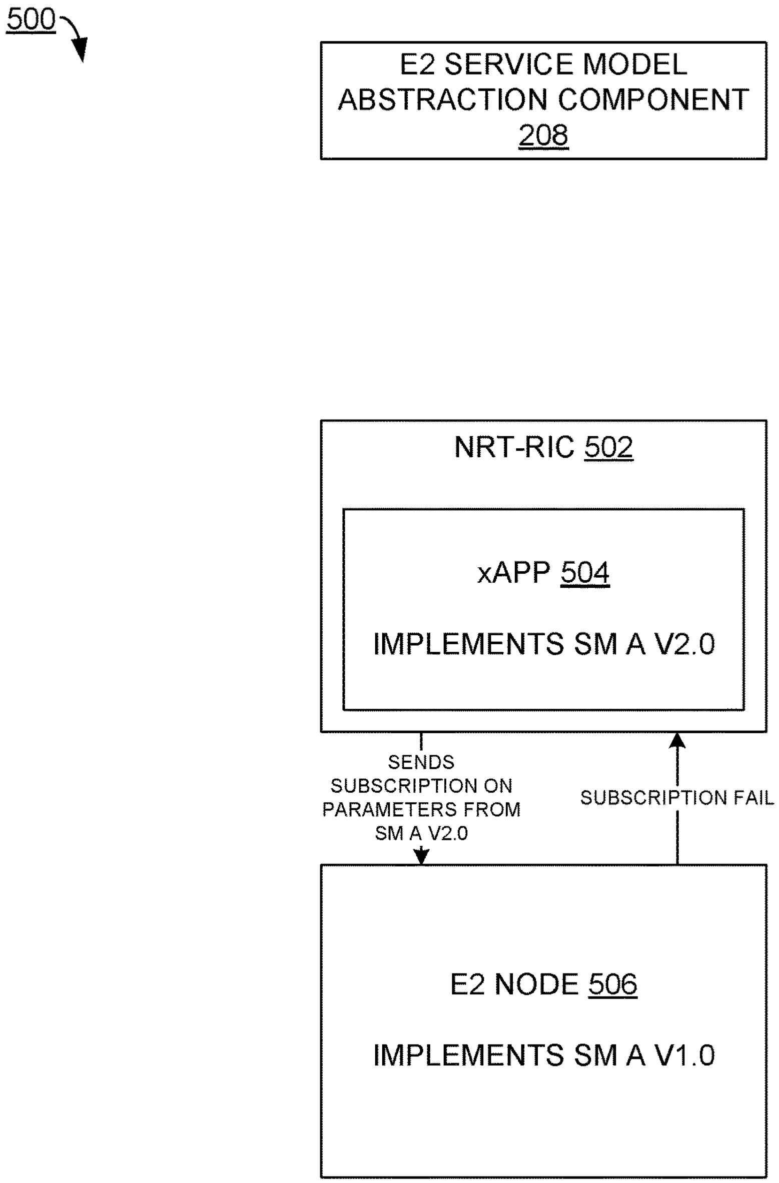
FIG. 5 illustrates another example system architecture that can facilitate E2 service model abstraction, in accordance with an embodiment of this disclosure.

FIG. 5 illustrates another example system architecture 500 that can facilitate E2 service model abstraction, in accordance with an embodiment of this disclosure. In some examples, part(s) of system architecture 500 can be used by part(s) of system architecture 200 of FIG. 2 to facilitate E2 service model abstraction.

System architecture 500 comprises NRT-RIC 502, xApp 504, e2 node 506, and E2 service model abstraction component 508 (which can be similar to E2 service model abstraction component 108 of FIG. 1).

In prior approaches, it can be that, if the xApp supports a different service model, or even a different version of the same SM, the subscription is rejected.

Figure 6:
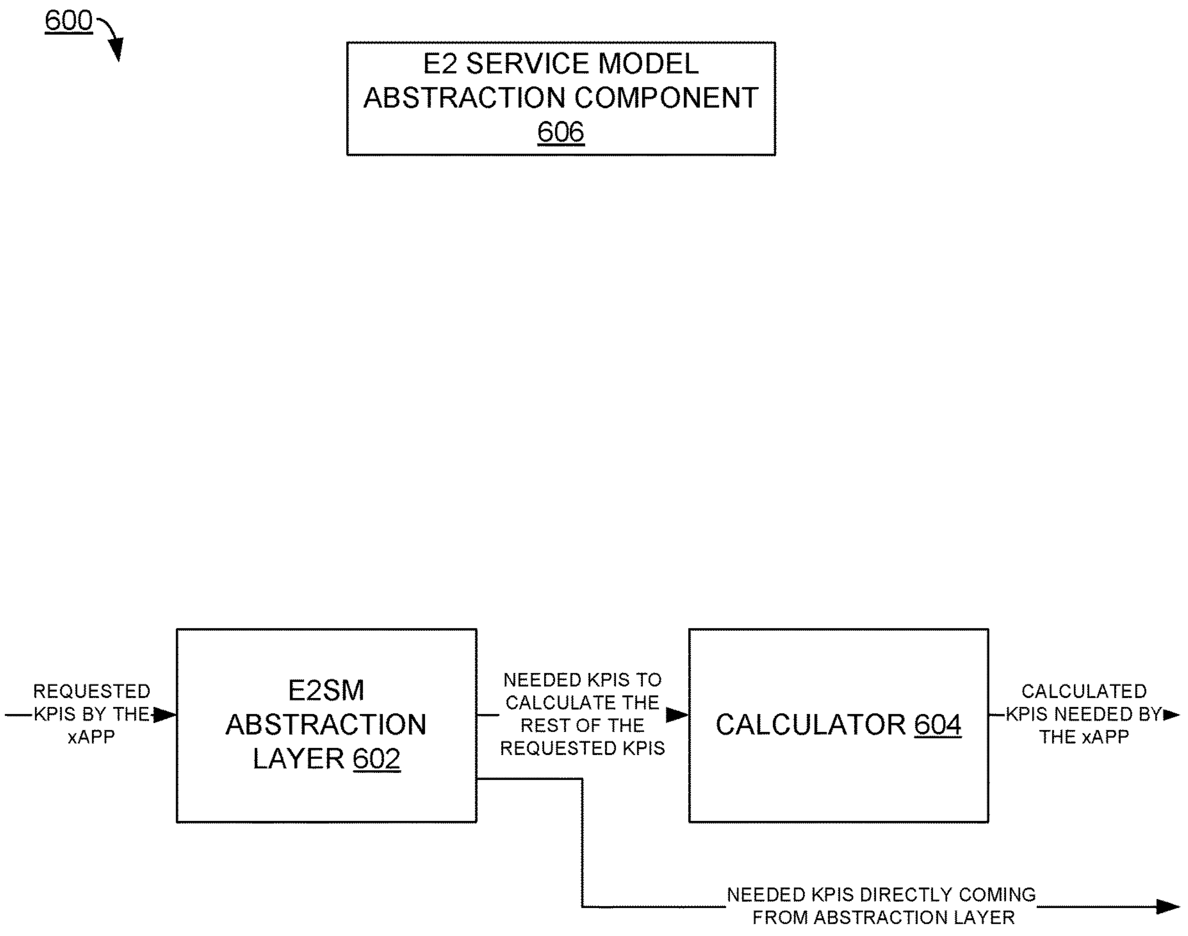
FIG. 6 illustrates another example system architecture that can facilitate E2 service model abstraction, in accordance with an embodiment of this disclosure.

FIG. 6 illustrates another example system architecture 600 that can facilitate E2 service model abstraction, in accordance with an embodiment of this disclosure. In some examples, part(s) of system architecture 600 can be used by part(s) of system architecture 200 of FIG. 2 to facilitate E2 service model abstraction.

System architecture 600 comprises E2SM abstraction layer 602 and calculator 604.

In some examples, the present techniques can be implemented as follows. xApps can be developed by third party software engineers, who can lack the knowledge to identify how to get the needed KPIs for the xApps. To alleviate this problem, the present techniques can be implemented to abstract the process of identifying the needed KPIs and identifying how to calculate these KPIs from existing KPIs. This solution can be based on creating a pipeline of components, such as the following.

An E2SM abstraction layer can be responsible for abstracting a process of getting the needed KPIs by the developers. It can be able to do so by fetching the needed KPIs from the E2 node and reporting them back to the xApp.

A calculator can be responsible for deriving the needed KPIs by the xApp from pre-existing KPIs that are supported by the E2SM abstraction layer.

The service model Abstraction Layer can abstract the service models from the xApps and allow xApp developers to focus on requesting KPIs rather than how to request them. This can allow xApps to work on an E2 Node regardless of what service model it supports, where the KPIs required by the xApps are available. The service model abstraction layer can comprise look-up tables that are passed KPIs, and service models supported by the E2 nodes, in order to identify O-RAN compliant KPIs that can be derived and are not directly available.

The service model abstraction layer can comprise a KPI-to-service-model component that converts KPI requests from an xApp into a subscription that fits the service models that are available in a corresponding E2 node.

Figure 7:
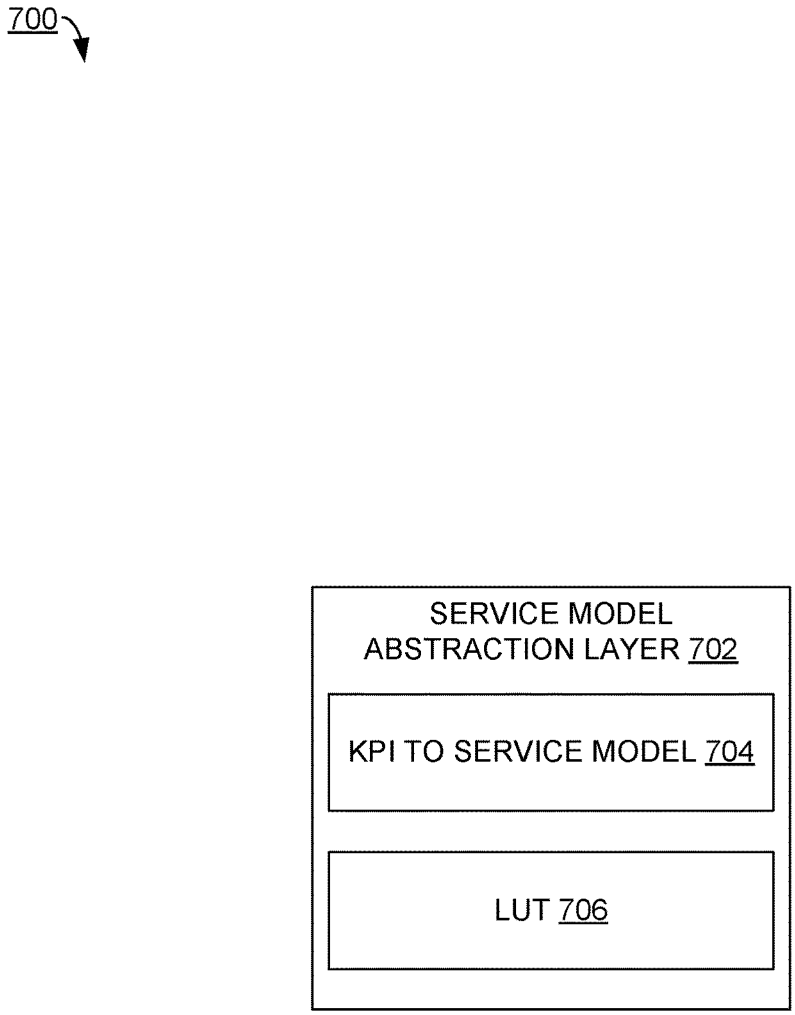
FIG. 7 illustrates another example system architecture that can facilitate E2 service model abstraction, in accordance with an embodiment of this disclosure.

FIG. 7 illustrates another example system architecture 700 that can facilitate E2 service model abstraction, in accordance with an embodiment of this disclosure. In some examples, part(s) of system architecture 700 can be used by part(s) of system architecture 200 of FIG. 2 to facilitate E2 service model abstraction.

System architecture 700 comprises service model abstraction layer 702, KPI to service model 704, and LuT 706.

Figure 8:
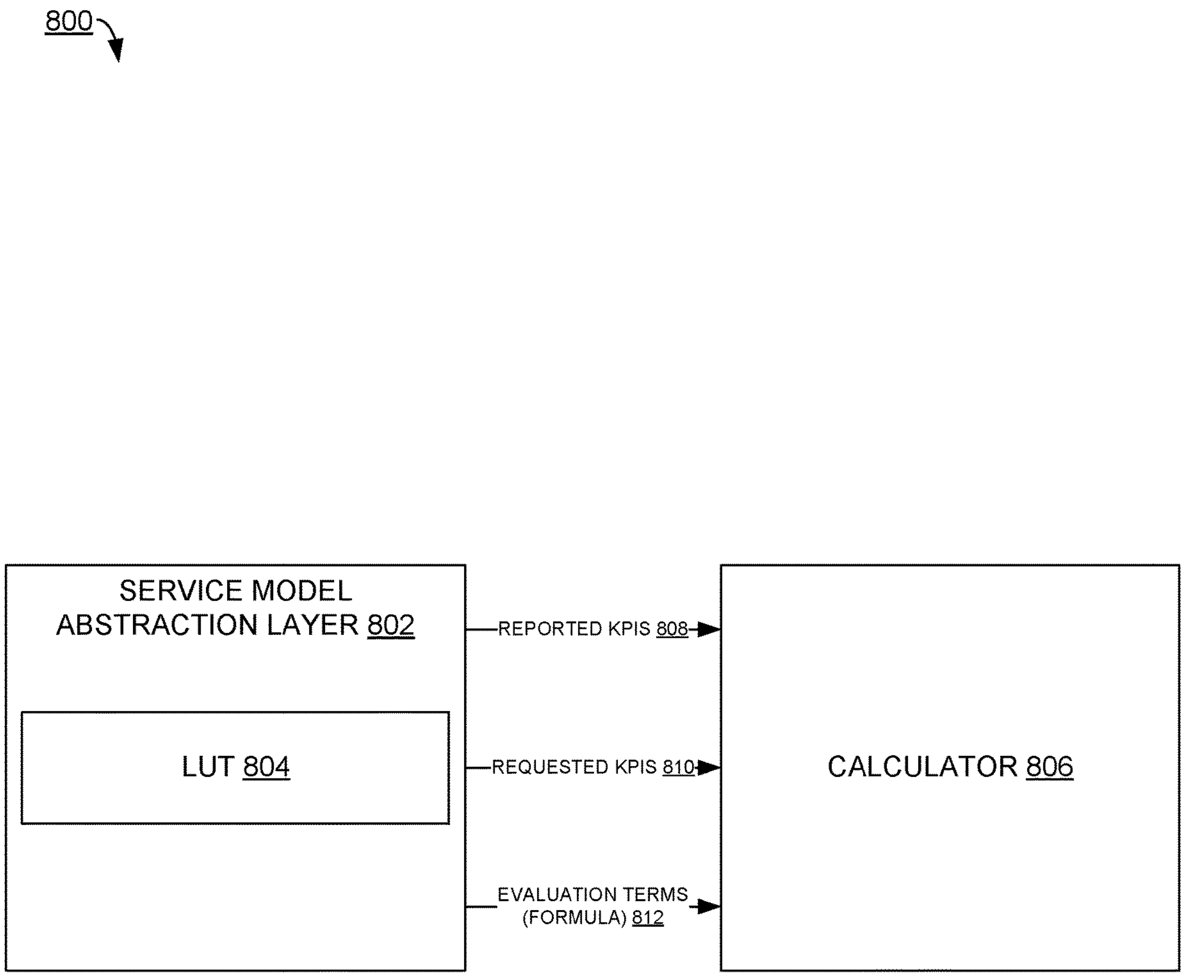
FIG. 8 illustrates another example system architecture that can facilitate E2 service model abstraction, in accordance with an embodiment of this disclosure.

FIG. 8 illustrates another example system architecture 800 that can facilitate E2 service model abstraction, in accordance with an embodiment of this disclosure. In some examples, part(s) of system architecture 800 can be used by part(s) of system architecture 200 of FIG. 2 to facilitate E2 service model abstraction.

System architecture 800 comprises E2 abstraction layer 802, LuT 804, calculator 806, reported KPIs 808, requested KPIs 810, evaluation terms (formula) 812.

The calculator component can be responsible for deriving a given KPI for a subscribing application (xApp), when the KPI is not directly available for subscription at the E2 node.

The calculator component can be triggered by an E2SM abstraction layer, receiving as input a set of KPIs reported by a E2 node, and a requested KPI to be derived.

With respect to a derived KPI, this can be:

$$\text{RSRQ}=(\text{Number of RB}*\text{RSRP})/\text{RSSI},$$

where RSRQ is reference signal received quality, RB is resource blocks, RSRP is reference signal received power, and RSSI is received signal strength indicator.

In another example, a derived KPI can be $$\text{rate of succeeded DL transmission}=(\text{Total DL transmission duration}-\text{Total failed DL transmission duration})/\text{Total DL transmission duration}$$

where DL is downlink.

By utilizing the E2 abstraction layer component, the calculator component can retrieve the evaluation terms (formula) to determine the requested KPI from the other reported KPIs. Finally, the derived KPI can be returned as a result to the E2 abstraction layer component.

Figure 9:
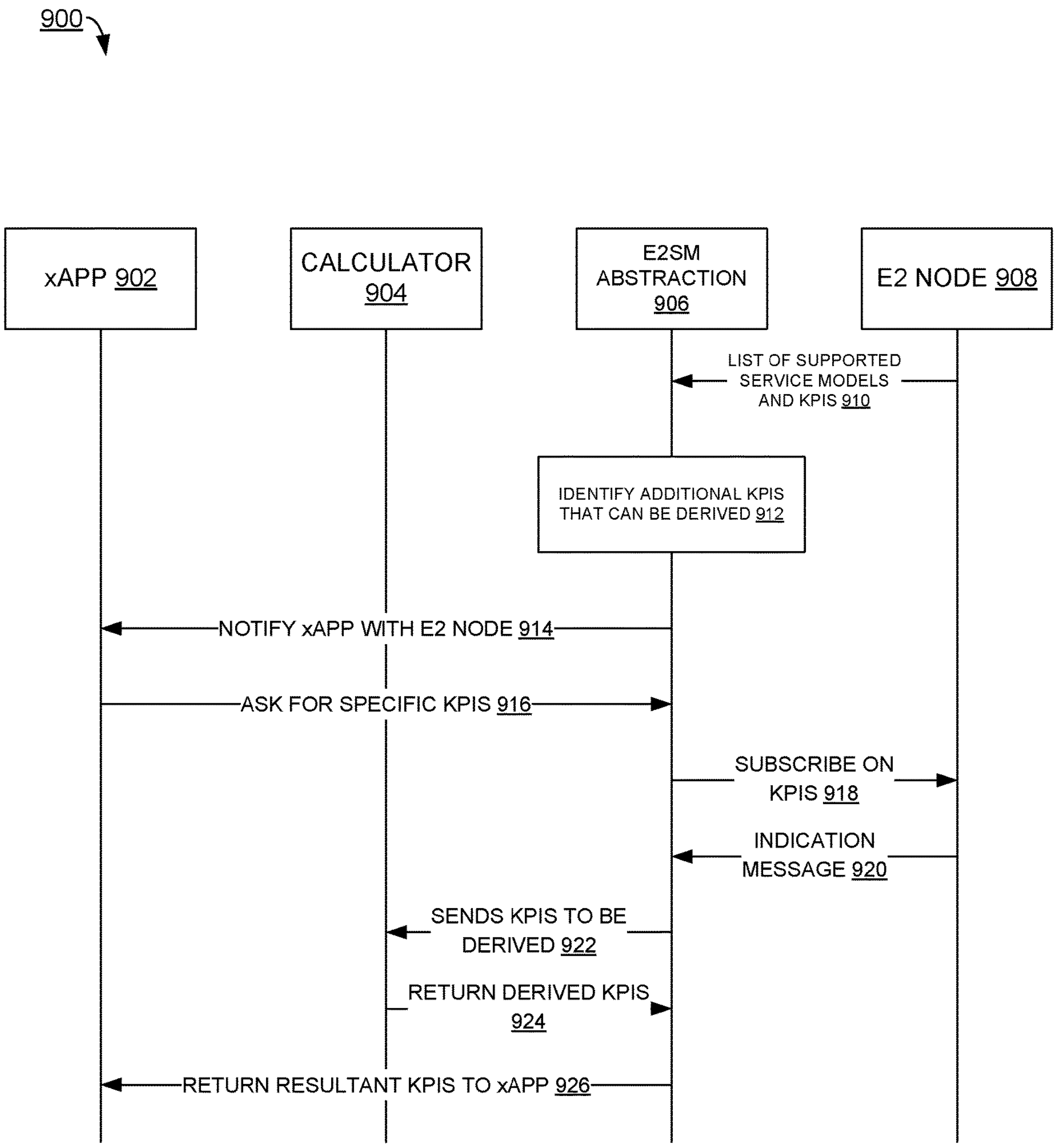
FIG. 9 illustrates an example signal flow that can facilitate E2 service model abstraction, in accordance with an embodiment of this disclosure.

FIG. 9 illustrates an example signal flow 900 that can facilitate E2 service model abstraction, in accordance with an embodiment of this disclosure. In some examples, part(s)

of signal flow 900 can be used by part(s) of system architecture 200 of FIG. 2 to facilitate E2 service model abstraction.

Signal flow 900 comprises xApp 902, calculator 904, E2SM abstraction 906, and E2 node 908.

Signals depicted in signal flow 900 are:

list of supported service models and KPIs 910;
identify additional KPIs that can be derived 912;
notify xApp with E2 node 914;
ask for specific KPIs 916;
subscribe on KPIs 918;
indication message 920;
sends KPIs to be derived 922;
return derived KPIs 924; and
return resultant KPIs to xApp 926.

In some examples, the present techniques can be implemented as follows.

An E2 node can register with a RIC, stating its supported service models, its versions, and its KPIs.

An E2SM abstraction later within a near-RT RIC can use look up tables to identify potential extra O-RAN compliant KPIs that can be derived based on the available KPIs from the E2 node.

If all the KPIs that a certain xApp needs is supported, the E2SM Abstraction Layer can notify an xApp that the E2 node exists and has registered with the RIC.

The xApp can then request specific KPIs in a service-model agnostic way from the E2SM Abstraction Layer. The E2SM Abstraction Layer can then formulate the required subscription using the service models required to achieve the KPIs from the E2 node, and then send the subscription to the E2 node.

The E2 node can send back indication messages containing the KPIs that have been subscribed on.

The E2SM Abstraction Layer can then check the KPIs against what the xApp originally wanted, and send any derived KPIs to the calculator in order to determine the derived KPIs.

Once all the KPIs are ready, they can be sent to the xApp.

Example Process Flows

FIG. 10 illustrates an example process flow 1000 that can facilitate E2 service model abstraction, in accordance with an embodiment of this disclosure. In some examples, one or more embodiments of process flow 1000 can be implemented by E2 service model abstraction component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

In some examples, process flow 1000 can be implemented in a system that comprises a near real-time radio access network intelligent controller that comprises an application, and a service management and orchestration platform. These components can be similar to controller (near real-time RIC) 104, xApp(s) 106, and SMO 114, respectively, of FIG. 1.

In some examples, the application comprises an xApp.

In some examples, a system that implements process flow 1000 can comprise a database used for storage by the near real-time radio access network intelligent controller, where the database is configured to store key performance indicators that are collected from the group of network nodes. That is, there can be a database that stores KPIs collected from E2 nodes.

In some examples, a system that implements process flow 1000 can comprise a database used for storage by the near real-time radio access network intelligent controller, where the database is configured to store subscription details from the application, and where the subscription details comprise a first indication of a requested key performance indicator, and a second indication of whether a request for the requested key performance indicator was accepted or failed. That is, there can be a database that stores subscription details (e.g., requested KPIs, and/or accepted/failed requests).

In some examples, process flow 1000 can be implemented by a near real-time radio access network intelligent controller that comprises an application and a service model component. In some examples, the near real-time radio access network intelligent controller comprises a database that is configured to store the key performance indicators.

Process flow 1000 begins with 1002, and moves to operation 1004.

Operation 1004 depicts the service model component receives respective indications of supported service models and key performance indicators from respective network nodes of a group of network nodes that is part of a radio access network. That is, an abstraction layer can receive lists of supported SMs and KPIs from E2 nodes.

After operation 1004, process flow 1000 moves to operation 1006.

Operation 1006 depicts the service model component receives a request from the application for a key performance indicator. That is, an xApp can subscribe to a KPI and an indication of this can be received by the abstraction layer.

After operation 1006, process flow 1000 moves to operation 1008.

Operation 1008 depicts the service model component subscribes to a network node of the group of network nodes for the key performance indicator. That is, the abstraction layer can subscribe to the KPI of operation 1006 on the xApp's behalf.

In some examples, the service model component is configured to determine a derived key performance indicator that is able to be derived from the key performance indicators that are identified in the indications of the supported service models and the key performance indicators. That is, KPIs can be derived from the KPIs of E2 nodes.

In some examples, the key performance indicator is the derived key performance indicator. That is, a derived KPI can be returned to an xApp.

In some examples, the service model component comprises a service model abstraction component and a service model derivation component, the service model abstraction component is configured to subscribe to the network node, and the service model derivation component is configured to determine the derived key performance indicator. That is, the present techniques can be implemented in a system architecture that comprises a SM abstraction layer and a calculator.

In some examples, the service model abstraction component requests that the service model derivation component determine the derived key performance indicator, the service model derivation component returns the derived key performance indicator to the service model abstraction component, and the service model abstraction component performs the returning of the key performance indicator to the application. That is, the abstraction layer can request that the calculator derive a KPI, the calculator can return the derived KPI to the abstraction layer, and the abstraction layer can send the derived KPI to the xApp.

After operation 1008, process flow 1000 moves to operation 1010.

Operation 1010 depicts the network node supports a service model that is unsupported by the application and that is supported by the service model component. In some examples, the xApp and E2 node are using different SMs, so are incompatible.

In some examples, the network node supports a first service model type, and the application supports a second service model type. That is, the node and the application can support different service models.

In some examples, the network node supports a first version of the service model, and wherein the application supports a second version of the service model. That is, the node and the application can support different versions of the same service model.

After operation 1010, process flow 1000 moves to operation 1012.

Operation 1012 depicts the key performance indicator is returned to the application via a communications protocol that is supported by the application. That is, the abstraction layer can return the KPI to the xApp in a way that the xApp understands.

After operation 1012, process flow 1000 moves to 1014, where process flow 1000 ends.

FIG. 11 illustrates an example process flow 1100 that can facilitate E2 service model abstraction, in accordance with an embodiment of this disclosure. In some examples, one or more embodiments of process flow 1100 can be implemented by E2 service model abstraction component 118 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts receiving, by a near real-time radio access network intelligent controller of a system comprising at least one processor, respective indications of supported service models and key performance indicators from respective network nodes of a group of network nodes in a radio access network. In some examples, operation 1104 can be implemented in a similar manner as operation 1004 of FIG. 10.

After operation 1104, process flow 1100 moves to operation 1106.

Operation 1106 depicts receiving, by the by the near real-time radio access network intelligent controller, a request from an application of the near real-time radio access network intelligent controller for a key performance indicator. In some examples, operation 1106 can be implemented in a similar manner as operation 1006 of FIG. 10.

After operation 1106, process flow 1100 moves to operation 1108.

Operation 1108 depicts subscribing, by the near real-time radio access network intelligent controller, to a network node of the group of network nodes for the key performance indicator, wherein the network node supports a service model that is unsupported by the application and that is supported by the near real-time radio access network intelligent controller. In some examples, operation 1108 can be implemented in a similar manner as operations 1008-1010 of FIG. 10.

In some examples, subscribing to the network node is performed according to the service model supported by the network node. That is, fetching a KPI from an E2 node can be performed according to the node's SM.

In some example, operation 1108 comprises converting, by the near real-time radio access network intelligent controller, the request from the application according to a first service model, before subscribing to the network node based on the request according to a second service model. That is, a service model abstraction layer can comprise a KPI to Service Model component that converts KPI requests from an xApp into a subscription that fits a service model that is available in the E2 Node.

In some examples, operation 1108 comprises accessing, by the near real-time radio access network intelligent controller, a look up table stored in the near real-time radio access network intelligent controller that stores respective key performance indicators and respective service models supported by respective network nodes of the group of network nodes, and identifying, based on the accessing and by the near real-time radio access network intelligent controller, a derived key performance indicator that can be derived from the respective key performance indicators and that is unavailable directly from the group of network nodes. That is, a service model abstraction layer can comprise look-up tables that can be passed KPIs and Service Models supported by the E2 Nodes in order to identify O-RAN-compliant KPIs that can be derived and are not available directly.

In some examples, operation 1108 comprises deriving, by the near real-time radio access network intelligent controller, a derived key performance indicator based on reported key performance indicators that are reported by the group of network nodes, a requested key performance indicator, and an indication of how to determine the requested key performance indicator from the reported key performance indicators. In some examples, the indication of how to determine the requested key performance indicator from the reported key performance indicators is stored in a look up table of the near real-time radio access network intelligent controller. That is, a calculator component can be triggered by a E2SM abstraction layer, receiving as input a group of KPIs reported by the E2 Node, and an indication of a requested KPI to be derived.

After operation 1108, process flow 1100 moves to operation 1110.

Operation 1110 depicts returning, by the near real-time radio access network intelligent controller, the key performance indicator to the application. In some examples, operation 1110 can be implemented in a similar manner as operation 1112 of FIG. 10.

After operation 1110, process flow 1100 moves to 1112, where process flow 1100 ends.

Figure 12:
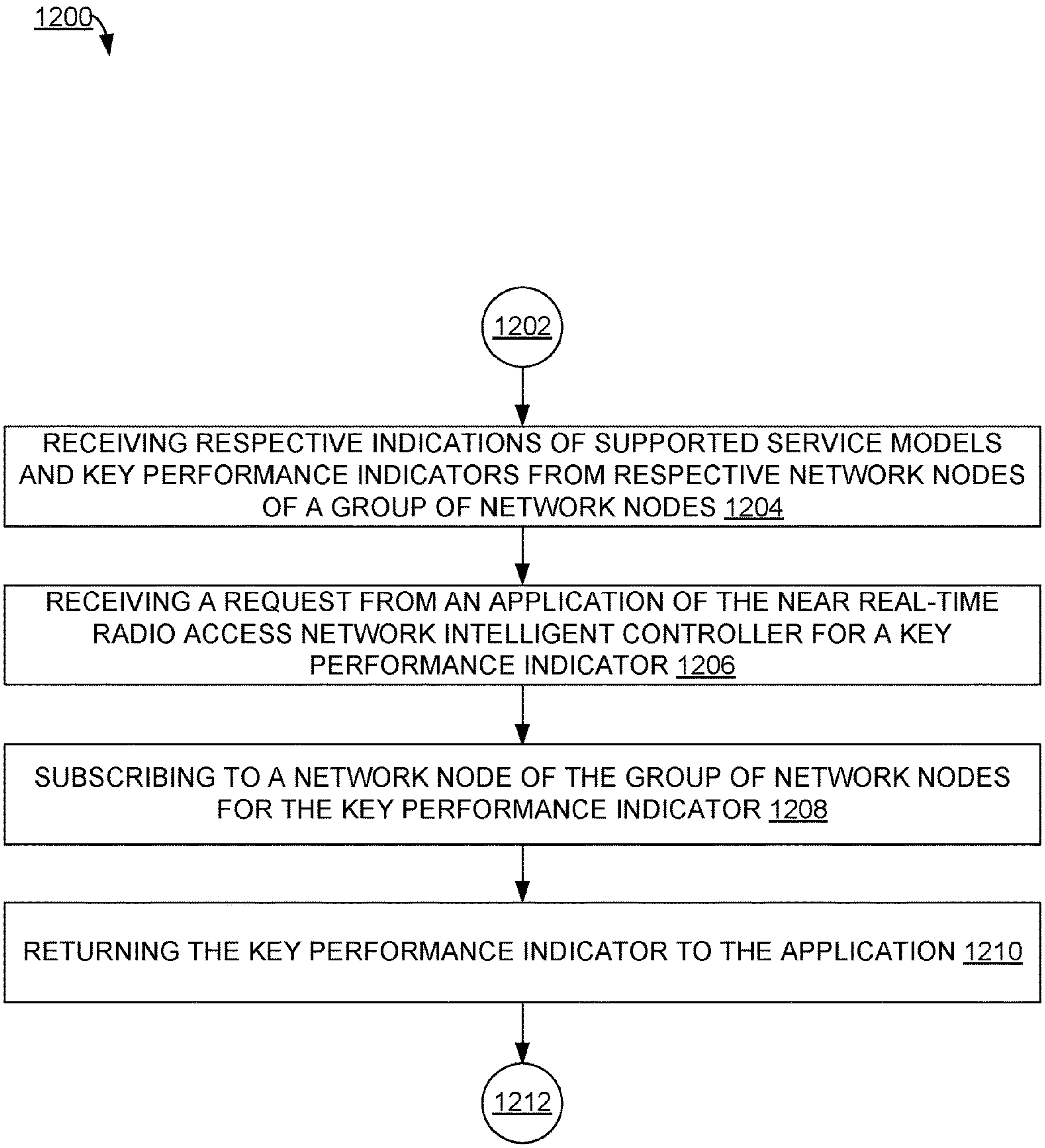
FIG. 12 illustrates another example process flow that can facilitate E2 service model abstraction, in accordance with an embodiment of this disclosure.

FIG. 12 illustrates an example process flow 1200 that can facilitate E2 service model abstraction, in accordance with an embodiment of this disclosure. In some examples, one or more embodiments of process flow 1200 can be implemented by E2 service model abstraction component 128 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1200 of FIG. 12.

Process flow 1200 begins with 1202, and moves to operation 1204.

Operation 1204 depicts receiving respective indications of supported service models and key performance indicators from respective network nodes of a group of network nodes. In some examples, operation 1204 can be implemented in a similar manner as operation 1004 of FIG. 10.

In some examples, the receiving of the respective indications of the supported service models and the key performance indicators from the respective network nodes is performed based on the respective network nodes registering with the near real-time radio access network intelligent controller. That is, an E2 node can register with a RIC, stating its supported SMs, its versions, and its KPIs.

In some examples, operation 1204 comprises notifying the application that the network node has registered with the near real-time radio access network intelligent controller, based on determining that all key performance indicators requested by the application are supported. That is, where all the KPIs that a certain xApp needs re supported, the E2SM abstraction layer can notify the xApp that a E2 node exists and has registered with the RIC.

After operation 1204, process flow 1200 moves to operation 1206.

Operation 1206 depicts receiving a request from an application of the near real-time radio access network intelligent controller for a key performance indicator. In some examples, operation 1206 can be implemented in a similar manner as operation 1006 of FIG. 10.

In some examples, the request is made according to a format that differs from a service model. That is, an xApp can request specific KPIs in a service-model agnostic way from an E2SM abstraction layer. The E2SM abstraction layer can formulate the required subscription using the service models required to achieve the KPIs from the E2 node, and then send the subscription to the E2 node.

After operation 1206, process flow 1200 moves to operation 1208.

Operation 1208 depicts subscribing to a network node of the group of network nodes for the key performance indicator. In some examples, operation 1208 can be implemented in a similar manner as operation 1008 of FIG. 10.

In some examples, operation 1208 comprises deriving a derived key performance indicator based on determining that the network node has returned to the near real-time radio access network intelligent controller a subset of a group of key performance indicators requested by the application, wherein the group of key performance indicators comprises the key performance indicators, and wherein the application requested the derived key performance indicator. That is, an E2 node can send back indication messages containing the KPIs that have been subscribed on.

The E2SM abstraction layer can then check the KPIs against what the xApp originally wanted, and sends any derived KPIs to a calculator in order to calculate the derived KPIs.

After operation 1208, process flow 1200 moves to operation 1210.

Operation 1210 depicts returning the key performance indicator to the application. In some examples, operation 1210 can be implemented in a similar manner as operation 1012 of FIG. 10.

After operation 1210, process flow 1200 moves to 1212, where process flow 1200 ends.

Example Operating Environment

Figure 13:
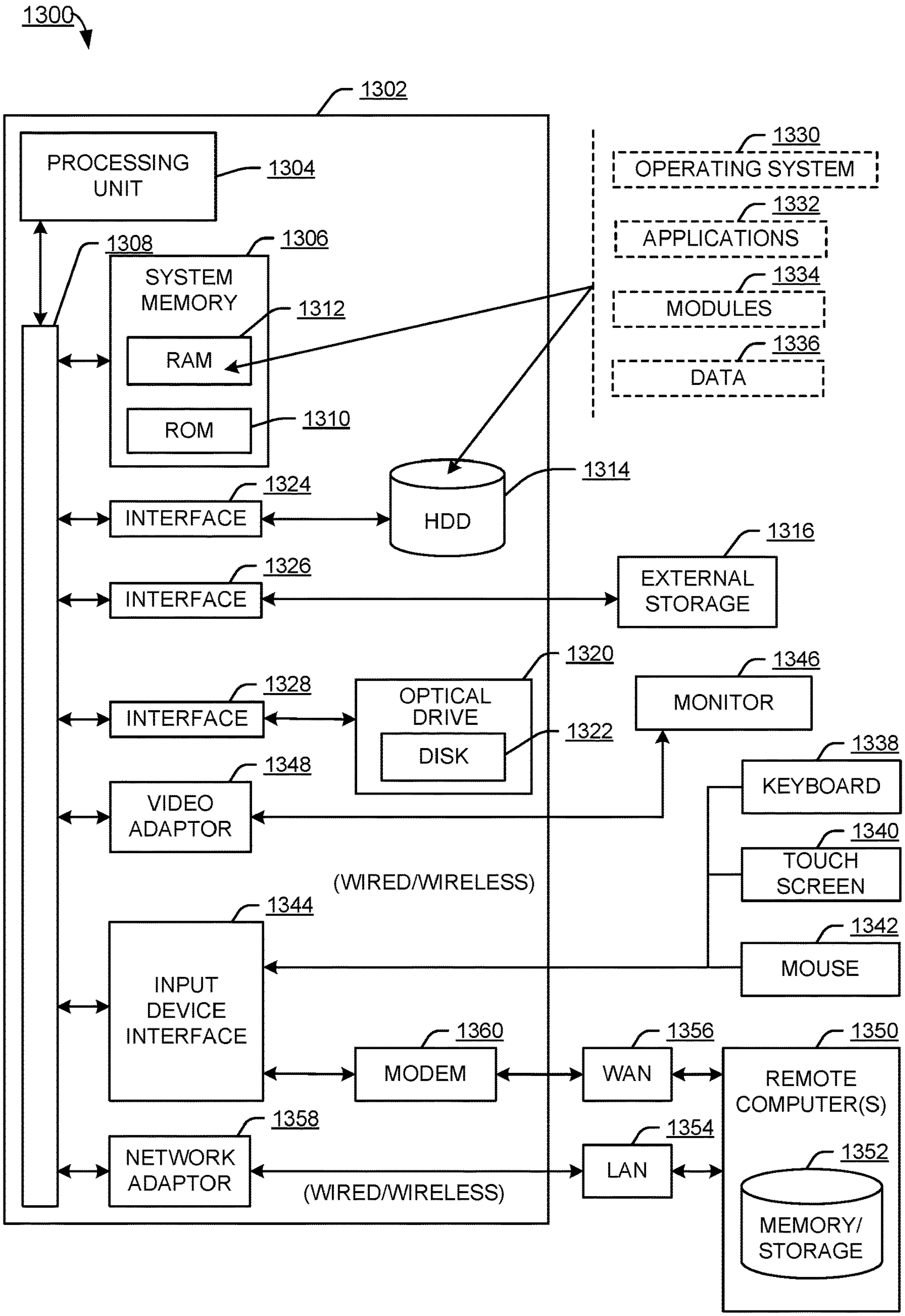
FIG. 13 illustrates an example block diagram of a computer operable to execute an embodiment of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of SMO 114 and/or controller (near-real time RIC) 104.

In some examples, computing environment 1300 can implement one or more embodiments of the process flows of FIGS. 10-12 to facilitate E2 service model abstraction.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

a near real-time radio access network intelligent controller that comprises an application and a service model component, wherein the service model component is configured to receive respective indications of supported service models and key performance indicators from respective network nodes of a group of network nodes that is part of a radio access network, wherein the service model component is configured to receive a request from the application for a key performance indicator, wherein the service model component is configured to subscribe to a network node of the group of network nodes for the key performance indicator, wherein the network node supports a service model that is unsupported by the application and that is supported by the service model component, and wherein the key performance indicator is returned to the application via a communications protocol that is supported by the application.

2. The system of claim 1, wherein the service model component is configured to determine a derived key performance indicator that is able to be derived from the key performance indicators that are identified in the indications of the supported service models and the key performance indicators.

3. The system of claim 2, wherein the key performance indicator is the derived key performance indicator.

4. The system of claim 2, wherein the service model component comprises a service model abstraction component and a service model derivation component, wherein the service model abstraction component is configured to subscribe to the network node, and wherein the service model derivation component is configured to determine the derived key performance indicator.

5. The system of claim 4, wherein the service model abstraction component requests that the service model derivation component determine the derived key performance indicator, wherein the service model derivation component returns the derived key performance indicator to the service model abstraction component, and wherein the service model abstraction component performs the returning of the key performance indicator to the application.

6. The system of claim 1, wherein the network node supports a first service model type, and wherein the application supports a second service model type.

7. The system of claim 1, wherein the network node supports a first version of the service model, and wherein the application supports a second version of the service model.

8. The system of claim 1, wherein the near real-time radio access network intelligent controller comprises a database that is configured to store the key performance indicators.

9. A method, comprising:

receiving, by a near real-time radio access network intelligent controller of a system comprising at least one processor, respective indications of supported service models and key performance indicators from respective network nodes of a group of network nodes in a radio access network;

receiving, by the by the near real-time radio access network intelligent controller, a request from an application of the near real-time radio access network intelligent controller for a key performance indicator;

subscribing, by the near real-time radio access network intelligent controller, to a network node of the group of network nodes for the key performance indicator, wherein the network node supports a service model that is unsupported by the application and that is supported by the near real-time radio access network intelligent controller; and returning, by the near real-time radio access network intelligent controller, the key performance indicator to the application.

10. The method of claim 9, wherein the subscribing to the network node is performed according to the service model supported by the network node.

11. The method of claim 9, further comprising:

converting, by the near real-time radio access network intelligent controller, the request from the application according to a first service model, before subscribing to the network node based on the request according to a second service model.

12. The method of claim 9, further comprising:

accessing, by the near real-time radio access network intelligent controller, a look up table stored in the near real-time radio access network intelligent controller that stores respective key performance indicators and respective service models supported by respective network nodes of the group of network nodes; and identifying, based on the accessing and by the near real-time radio access network intelligent controller, a derived key performance indicator that can be derived from the respective key performance indicators and that is unavailable directly from the group of network nodes.

13. The method of claim 9, further comprising:

deriving, by the near real-time radio access network intelligent controller, a derived key performance indicator based on reported key performance indicators that are reported by the group of network nodes, a requested key performance indicator, and an indication of how to determine the requested key performance indicator from the reported key performance indicators.

14. The method of claim 13, wherein the indication of how to determine the requested key performance indicator from the reported key performance indicators is stored in a look up table of the near real-time radio access network intelligent controller.

15. The method of claim 9, wherein the group of network nodes comprises E2 nodes.

16. A non-transitory computer-readable medium comprising instructions that, in response to execution, cause a near real-time radio access network intelligent controller of a system comprising at least one processor to perform operations, comprising:

receiving respective indications of supported service models and key performance indicators from respective network nodes of a group of network nodes;

receiving a request from an application of the near real-time radio access network intelligent controller for a key performance indicator;

subscribing to a network node of the group of network nodes for the key performance indicator; and returning the key performance indicator to the application.

17. The non-transitory computer-readable medium of claim 16, wherein the receiving of the respective indications of the supported service models and the key performance indicators from the respective network nodes is performed based on the respective network nodes registering with the near real-time radio access network intelligent controller.

18. The non-transitory computer-readable medium of claim 16, wherein the operations further comprise:

notifying the application that the network node has registered with the near real-time radio access network intelligent controller, based on determining that all key performance indicators requested by the application are supported.

19. The non-transitory computer-readable medium of claim 16, wherein the request is made according to a format that differs from a service model.

20. The non-transitory computer-readable medium of claim 16, wherein the operations further comprise:

deriving a derived key performance indicator based on determining that the network node has returned to the near real-time radio access network intelligent controller a subset of a group of key performance indicators requested by the application, wherein the group of key performance indicators comprises the key performance indicators, and wherein the application requested the derived key performance indicator.

* * * * *